United States Patent [19]

Stephenson et al.

[11] Patent Number: 5,186,212
[45] Date of Patent: Feb. 16, 1993

[54] FLUID CONTROLLER HAVING AXIAL MODULATION

[75] Inventors: Dwight B. Stephenson, Savage; Don R. Draper, Chanhassen, both of Minn.

[73] Assignee: Eaton Corporation, Cleveland, Ohio

[21] Appl. No.: 819,715

[22] Filed: Jan. 13, 1992

Related U.S. Application Data

[63] Continuation-in-part of Ser. No. 602,829, Oct. 24, 1990, Pat. No. 5,080,135.

[51] Int. Cl.[5] .............................................. F15B 13/02
[52] U.S. Cl. ................................ 137/625.24; 60/384
[58] Field of Search .................... 60/384; 91/467; 137/625.24

[56] References Cited

U.S. PATENT DOCUMENTS 2,833,253  5/1958  Wittren .
3,152,610  10/1964  McAfee .
3,385,057  5/1968  Pruvot et al. .
4,174,612  11/1979  Liebert .
5,016,672  5/1991  Stephenson ..................... 137/625.24

Primary Examiner—Gerald A. Michalsky
Attorney, Agent, or Firm—L. J. Kasper

[57] ABSTRACT

A fluid controller (11) is disclosed of the type including a housing (13), a fluid meter (17), a primary (spool) valve (35), and a follow-up (sleeve) valve (37). An inlet port (23) is in communication with a series of fluid ports (85), and operating ports (91L and 91R) are in communication with the cylinder ports (27 and 29). Rotation of the spool relative to the sleeve causes axial displacement of the sleeve as a result of the configuration of a pin opening (55) in which a drive pin (53) is disposed. After a certain amount of axial movement of the sleeve, the various ports (85,91L,91R) begin to communicate with a pair of meter grooves (67R and 67L) and a tank groove (71R), respectively, to define variable axial flow control orifices (A1a, A4a, A5a).

20 Claims, 6 Drawing Sheets

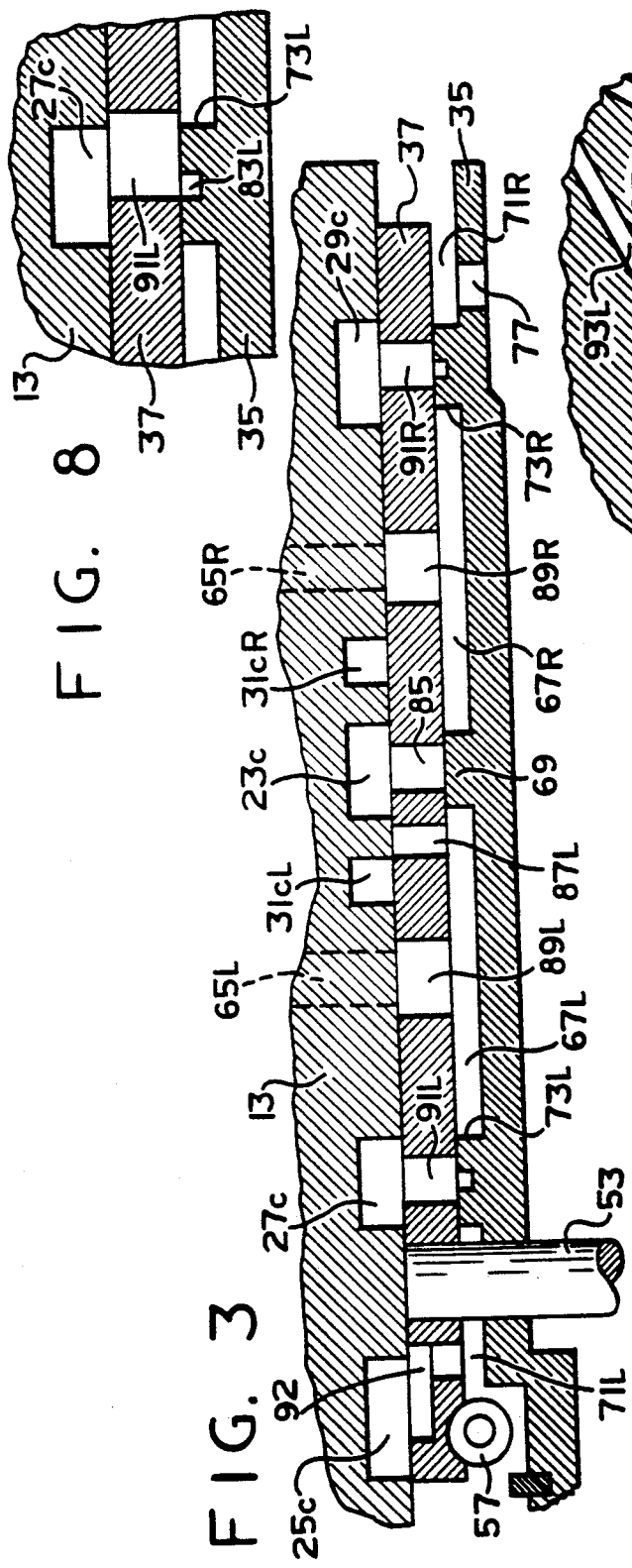
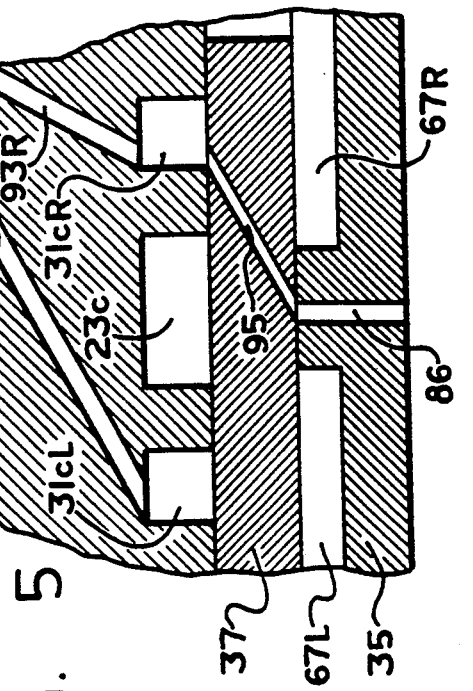
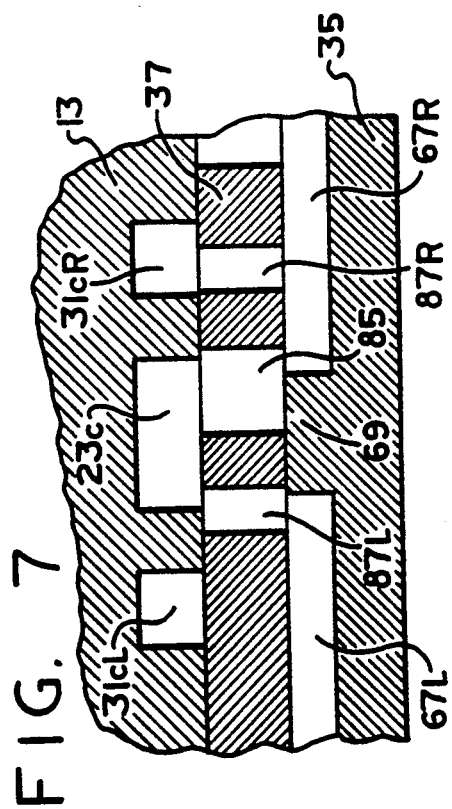

5,186,212

FLUID CONTROLLER HAVING AXIAL MODULATION

CROSS REFERENCE TO RELATED APPLICATION

This application is a continuation-in-part (CIP) of co-pending application U.S. Ser. No. 602,829, filed Oct. 24, 1990, now U.S. Pat. No. 5,080,135, in the name of Dwight B. Stephenson for a "LARGE DEFLECTION ANGLE ROTARY MODULATION STEERING VALVE".

BACKGROUND OF THE DISCLOSURE

The present invention relates to a fluid controller of the type used to control the flow of fluid from a source of pressurized fluid to a fluid pressure operated device, such as a vehicle steering cylinder.

A typical fluid controller of the type to which the present invention relates includes a housing which defines various fluid ports, and further includes a fluid meter, a primary valve member, a follow-up valve member, and an arrangement for imparting follow-up movement to the follow-up valve member in accordance with the fluid flow through the fluid meter. The flow through the controller valving is directly proportional to the area of the main variable flow control orifice which, in turn, is proportional to the relative displacement between the primary and follow-up valve members.

In conventional fluid controllers of the type described above, the primary valve member has been rotatable, and the follow-up valve member has been relatively rotatable, with the various flow control orifices being defined by the overlap of passages and ports defined by the primary and follow-up valve members, respectively, as the primary valve member is rotated, relative to the follow-up valve member.

Although fluid controllers of the type described above have been satisfactory in operation, and very successful commercially, there are inherent drawbacks to fluid controllers of that type. Typical spool-sleeve fluid controllers which define variable flow control orifices in response to relative rotation of the spool and sleeve typically require that the spool include a substantial number of axially-extending milled slots or passageways on the surface of the spool, thus adding to the cost and complexity of the manufacturing process. In addition, it is more difficult in such controllers to provide suitable pressure balancing of the sleeve, to prevent it from clamping onto the outer surface of the spool, in a region where the sleeve is surrounded by pressurized fluid, for example, in an annular chamber defined by the housing.

SUMMARY OF THE INVENTION

Accordingly, it is an object of the present invention to provide a fluid controller of the spool-sleeve type which overcomes the above-described disadvantages of the costly and complex manufacturing of the spool, and the difficulty of pressure balancing.

The above, and other objects of the present invention are accomplished by the provision of an improved controller operable to control the flow of fluid from a source of pressurized fluid to a fluid pressure operated device. The controller is of the type including housing means defining an inlet port for connection to the source of pressurized fluid, a return port for connection to a reservoir, and first and second control fluid ports for connection to the fluid pressure operated device. Valve means is disposed in the housing means and comprises a primary rotatable valve member and a cooperating relative rotatable follow-up valve member, the primary and follow-up valve members defining a neutral position and a first operating position in which the primary valve member is rotatably displaced from the neutral position, relative to the follow-up valve member, in a first direction. The primary valve member defines first and second fluid passages, and the follow-up valve member defines first and second fluid ports in continuous fluid communication with the inlet port and the first control fluid port, respectively. The first and second fluid ports are blocked from fluid communication with the first and second fluid passages, respectively, when the valve members are in the neutral position, and the first and second fluid ports are in fluid communication with the first and second fluid passages, respectively, when the valve members are in the first operating position. The housing means and the valve members cooperate to define a first main fluid path providing fluid communication from the inlet port to the first control fluid port, and from the second control fluid port to the return port, when the valve members are in the first operating position.

The improved controller is characterized by means operable, in response to relative rotational displacement of the primary and follow-up valve members, to move the follow-up valve member in a first axial direction to the first operating position. The first and second fluid ports cooperate with the first and second fluid passages, respectively, to define first and second variable axial flow control orifices, respectively, when the follow-up valve member is axially displaced to the first operating position. The first main fluid path includes the first and second variable axial flow control orifices.

BRIEF DESCRIPTION OF THE DRAWINGS

FIG. 3 is an enlarged, fragmentary, axial cross-section, similar to FIG. 1, taken on line 3—3 of FIG. 2.

FIG. 5 is an enlarged, fragmentary, axial cross-section, taken on line 5—5 of FIG. 2.

FIG. 7 is an enlarged, fragmentary, axial cross-section, taken on line 7—7 of FIG. 6.

FIG. 8 is an enlarged, fragmentary, axial cross-section, taken on line 8—8 of FIG. 6.

DESCRIPTION OF THE PREFERRED EMBODIMENT

Figure 1:
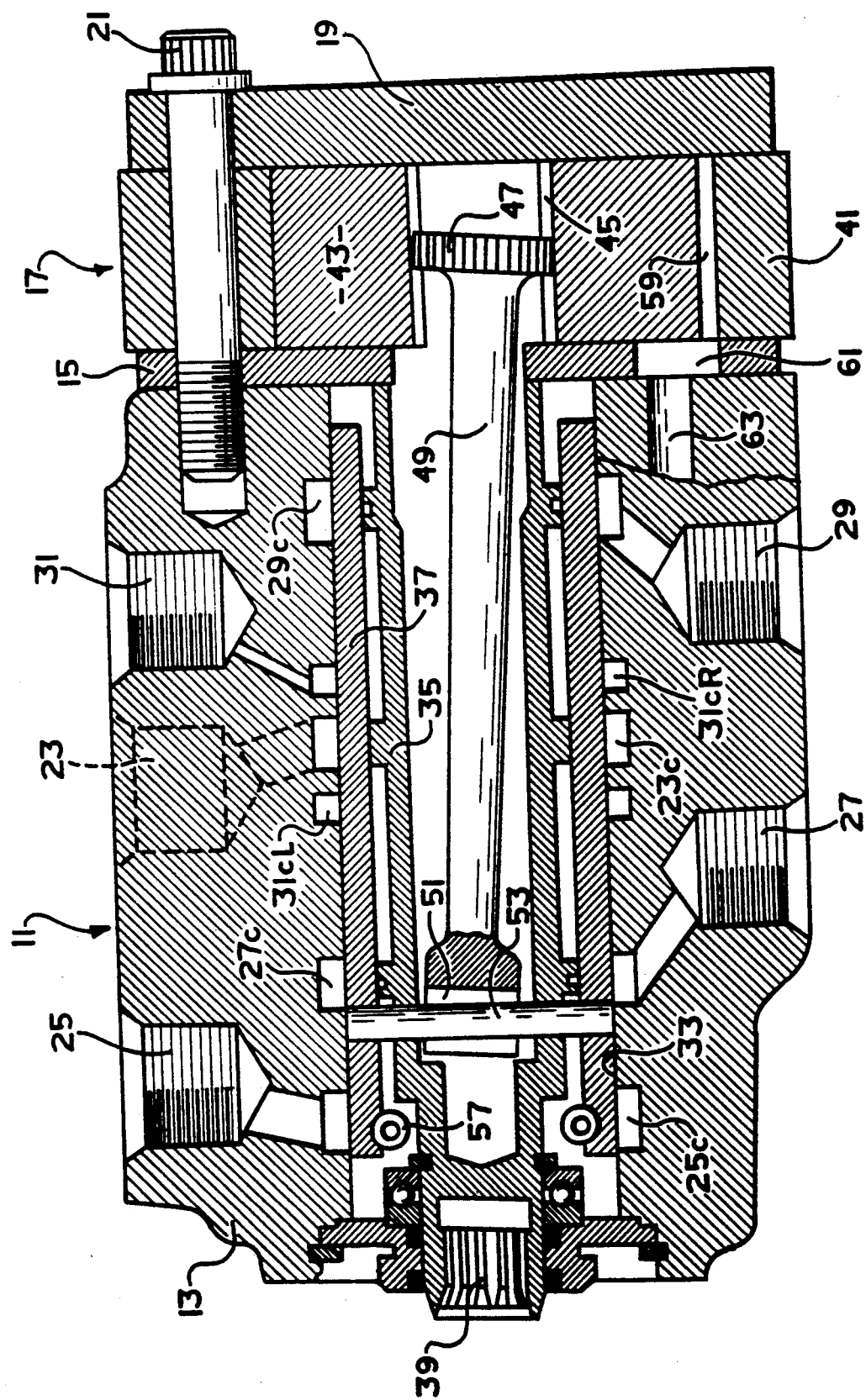
FIG. 1 is an axial cross-section of a fluid controller made in accordance with the present invention.

Referring now to the drawings, which are not intended to limit the invention, FIG. 1 is an axial cross-section of a fluid controller of the type with which the present invention may be utilized, although it should be understood that the present invention is not limited to any particular configuration of fluid controller, except as noted hereinafter.

The fluid controller, generally designated 11, may be of the type illustrated and described in U.S. Pat. No. Re. 25,126, assigned to the assignee of the present invention and incorporated herein by reference. The subject embodiment is more specifically of the type illustrated and described in U.S. Pat. No. 5,016,672, also assigned to the assignee of the present invention and incorporated herein by reference. However, the present invention differs very substantially from the above-cited patents, as will be described in greater detail subsequently, primarily in connection with the description of the controller valving in FIGS. 2 through 6.

The fluid controller 11 comprises several sections, including a valve housing section 13, a wear plate 15, a section comprising a fluid meter 17, and an end cap 19. These sections are held together in tight sealing engagement by means of a plurality of bolts 21, which are in threaded engagement with the valve housing section 13. The valve housing section defines a fluid inlet port 23 (shown only in dotted lines in FIG. 1), a fluid return port 25, a pair of control (cylinder) fluid ports 27 and 29, and a load sensing fluid port 31.

The valve housing section 13 also defines a valve bore 33, and rotatably disposed therein is the controller valving which comprises a primary, rotatable valve member 35 (also referred to hereinafter as the "spool"), and a cooperating, relatively rotatable follow-up valve member 37 (also referred to hereinafter as the "sleeve"). At the forward end of the spool 35 is a set of internal splines 39 which provide for direct mechanical connection between the spool 35 and a vehicle steering wheel (not shown herein). The spool 35 and the sleeve 37 will be described in greater detail subsequently.

The fluid meter 17 may be of the type well known in the art, and in the subject embodiment, includes an internally-toothed ring member 41, and an externally-toothed star member 43. The star member 43 is eccentrically disposed within the ring member 41, for orbital and rotational movement relative thereto. The star member 43 defines a set of internal splines 45, and in splined engagement therewith is a set of external splines 47 formed at the rearward end of a main drive shaft 49, which has a bifurcated forward end 51. The forward end 51 permits driving connection between the shaft 49 and the sleeve 37, by means of a drive pin 53. The ends of the pin 53 pass through a pair of pin openings 55 (not shown in FIG. 1, but shown in FIG. 2) defined by the spool 35, and are received in relatively close fit openings in the sleeve 37.

As is well known to those skilled in the art, pressurized fluid flows through the various passages and ports defined by the spool 35 and sleeve 37, then flows through the fluid meter 17, causing orbital and rotational movement of the star 43, within the ring 41. Such movement of the star 43 causes rotational follow-up movement of the sleeve 37, by means of the drive shaft 49 and drive pin 51, to maintain a particular relative displacement between the spool 35 and sleeve 37. The particular relative displacement (referred to hereinafter as an "operating position"), is generally proportional to the rate of rotation of the steering wheel, i.e., the rate of rotation of the spool 35.

Referring still to FIG. 1, disposed adjacent the forward end (left end in FIG. 1) of the spool 35 and the sleeve 37, is a neutral centering spring arrangement, represented in FIG. 1 by a portion of a coiled compression spring 57. The spring arrangement may be of the type illustrated and described in greater detail in co-pending application U.S. Ser. No. 793,061, filed Nov. 15, 1991, in the name of Dwight B. Stephenson for a "FLUID CONTROLLER HAVING ROTARY/AXIAL VALVING, AND SPRING ARRANGEMENT THEREFOR", assigned to the assignee of the present invention and incorporated herein by reference. Typically, the spring arrangement would include one, two, or perhaps three of the coiled springs 57, the function of which is to bias the sleeve 37 toward a "neutral position" (as that term will be defined in connection with FIG. 2), relative to the spool 35.

The valve bore 33 of the valve housing section 13 defines a plurality of annular fluid chambers surrounding the sleeve 37, to provide fluid communication between the various ports (23 through 31) and the outer surface of the sleeve 37. An annular chamber 23c receives pressurized fluid from the inlet port 23, while an annular chamber 25c communicates return fluid to the return port 25. Annular chambers 27c and 29c provide fluid communication to and from the control ports 27 and 29, respectively. Finally, a pair of annular chambers 31cL and 31cR provide communication of a load signal to the load sensing fluid port 31.

The toothed interaction of the star 43, orbiting and rotating within the ring 41, defines a plurality of expanding and contracting fluid volume chambers 59, and adjacent each such chamber 59, the wear plate 15 defines a fluid port 61. The valve housing section 13 defines a plurality of axial bores 63 (only one of which is shown in FIG. 1), each of which is in open communication with one of the fluid ports 61. The valve housing 13 further defines a pair of radial bores 65L and 65R (not shown in FIG. 1, but shown in FIG. 3), providing communication between each of the axial bores 63 and the valve bore 33, for purposes which are well known to those skilled in the art, and will be described in greater detail subsequently.

It is believed that the general operation of the fluid controller 11 is well known to those skilled in the art. As the steering wheel is rotated, for example, in a counter-clockwise direction, to achieve a left turn of the vehicle, the spool 35 is also rotated counter-clockwise, as viewed by the vehicle operator, opening up a series of variable flow control orifices between the spool 35 and the sleeve 37. These orifices permit fluid communication from the annular chamber 23c through the valving, then through the radial bores 65R and the axial bores 63 to the expanding volume chambers 59 of the fluid meter 17. Fluid flowing from the contracting volume chambers of the meter 17 ("metered fluid") flows through the other of the axial bores 63, then through the radial bores 65L, and through the valving, then out through the annular chamber 27c to the cylinder port 27. Fluid returning from the steering cylinder enters the cylinder port 29, then flows through the annular chamber 29c, through the valving, and then out through the annular chamber 25c, then to the return port 25. The above-described fluid path, or some portion thereof, is typically referred to as the "main fluid path", and the use of that term hereinafter and in the appended claims will be understood to mean the above-described fluid path, or a portion thereof, when the spool 35 and the sleeve 37 are in any type of operating position.

It is one important aspect of the present invention to be able to define variable flow control orifices in the controller valving, primarily in response to axial motion of the sleeve 37, relative to the spool 35 although, in the subject embodiment, there are also variable flow control orifices defined in response to rotary motion of the spool 35 relative to the sleeve 37. As may be seen in FIGS. 1 and 2, in order to facilitate axial motion of the sleeve 37, relative to the spool 35, the sleeve is axially shorter than the adjacent portion of the spool.

Valving Arrangement

Figure 2:
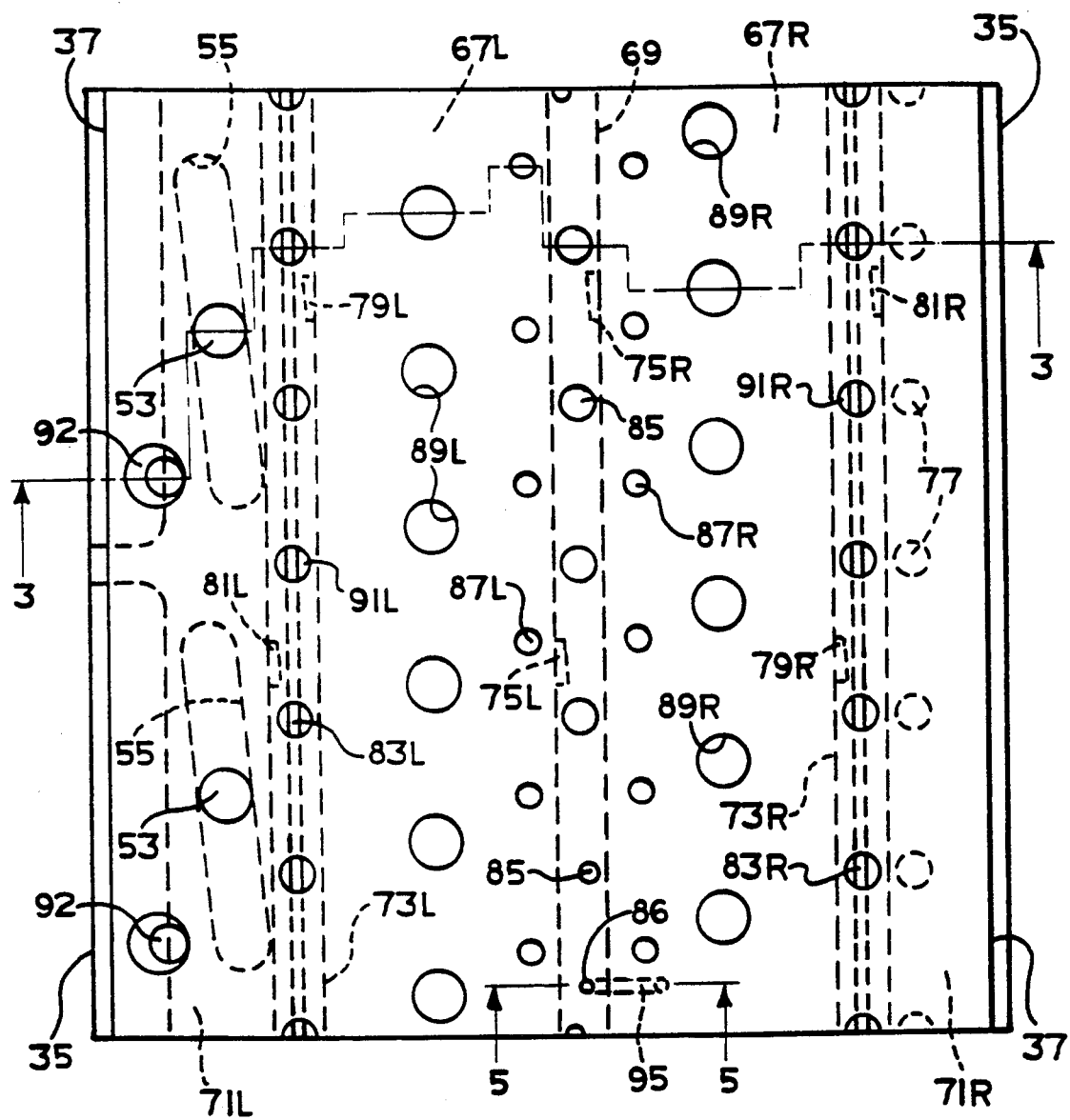
FIG. 2 is an overlay view of the valving of the fluid controller shown in FIG. 1, but on a slightly larger scale than in FIG. 1, with the valving being illustrated in its neutral position.

Referring now primarily to FIGS. 2 and 3, the spool 35 and sleeve 37 will be described in greater detail, with regard to the various ports and passages defined thereby. In connection with the subsequent description, it should be noted that many of the ports and passages are arranged symmetrically, or generally symmetrically with respect to the annular chamber 23c, and such elements will be described by a reference numeral, followed by either an "L" or an "R", to indicate that the element is located on either the left side or the right side, respectively, of the chamber 23c. On the other hand, certain of the other elements are either centered relative to the chamber 23c, or, although not centered, do not have a corresponding element oppositely disposed about the chamber 23c, and will be referred to by use of a reference numeral alone.

Figure 4:
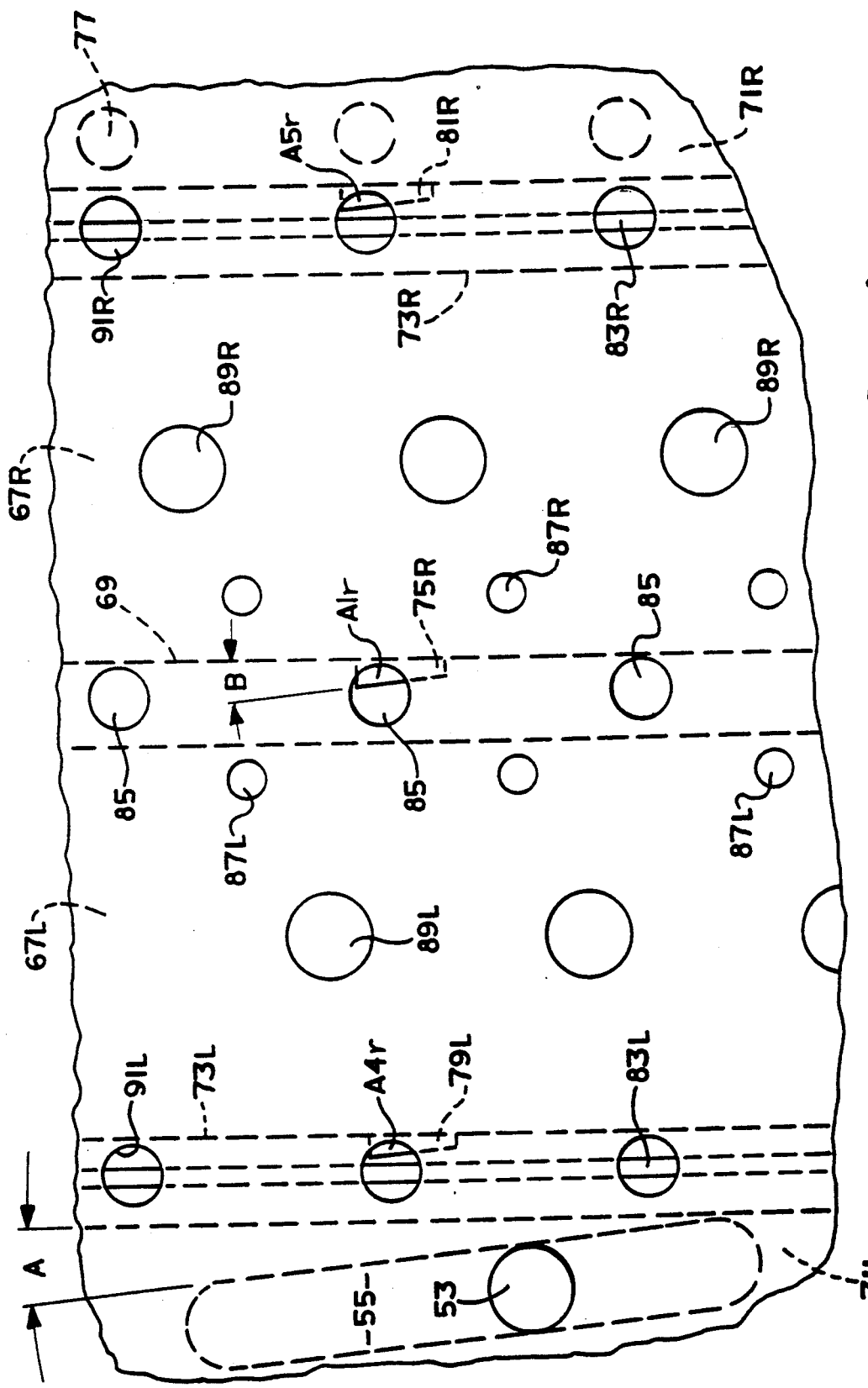
FIG. 4 is an enlarged, fragmentary, overlay view, similar to FIG. 2, with the valving displaced to a first operating position (a left turn).
Figure 6:
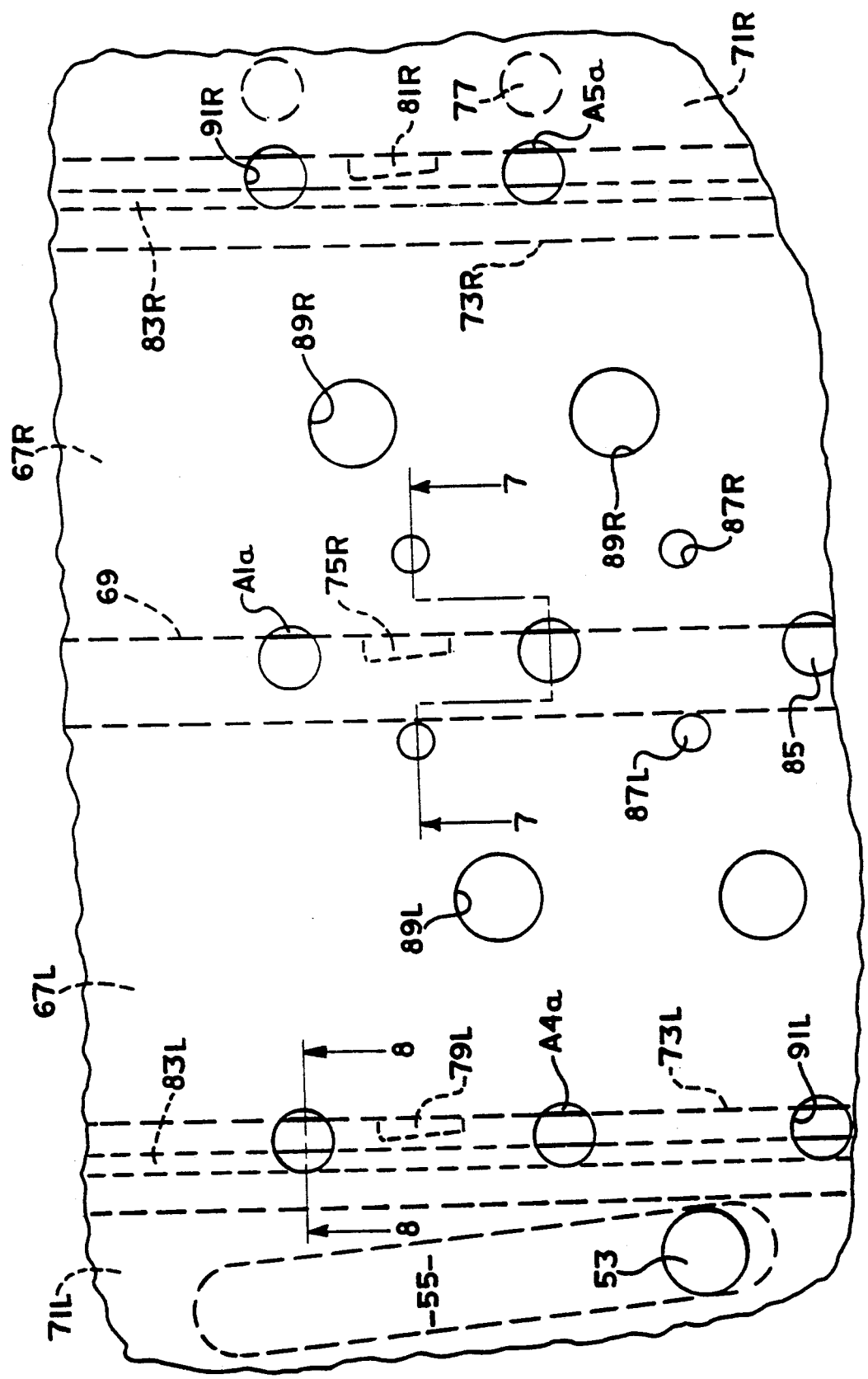
FIG. 6 is an enlarged, fragmentary, overlay view, similar to FIG. 3, but with the valving displaced toward a maximum displacement position (still in a left turn).

It should be understood that the various overlay views, such as FIGS. 2, 4, and 6, are intended to illustrate primarily the interface between the spool 35 (primarily, dashed lines) and the sleeve 37 (solid lines). The spool 35 defines a pair of generally annular meter grooves 67L and 67R, which cooperate to define therebetween a spool land 69. Disposed toward the left end in FIGS. 2 and 3, the spool 35 defines a generally annular tank groove 71L, and disposed toward the right end, the spool defines a generally annular tank groove 71R. Disposed between the grooves 67L and 71L, the spool defines a spool land 73L, and similarly, the grooves 67R and 71R cooperate to define a spool land 73R. As may best be seen in FIG. 3, with the spool and sleeve in the neutral position illustrated in FIGS. 2 and 3, the spool land 69 is axially aligned with the annular chamber 23c, while the spool lands 73L and 73R are axially aligned with the annular chambers 27c and 29c, respectively.

Referring still primarily to FIG. 2, the portion of the spool 35 which forms the tank groove 71L also defines the pair of pin openings 55, mentioned previously in connection with FIG. 1. The construction and function of the openings 55 will be described in greater detail subsequently. It should be noted, however, that the openings extend from the groove 71L through to the interior of the spool 35. The spool land 69 defines a circumferentially-extending notch 75L, and a circumferentially-extending notch 75R, the notches 75L and 75R being in open communication with the meter grooves 67L and 67R, respectively. The spool 35 also defines a plurality of tank ports 77, disposed to the right of the spool land 73R, and extending through to the interior of the spool.

The spool lands 73L and 73R define circumferentially-extending notches 79L and 79R, respectively, communicating with the meter grooves 67L and 67R, respectively. The spool lands 73L and 73R further define circumferentially-extending notches 81L and 81R, respectively, in fluid communication with the tank grooves 71L and 71R, respectively. Finally, the spool lands 73L and 73R define pressure balancing grooves 83L and 83R, respectively, the function of these elements to be described subsequently.

The sleeve 37 defines a plurality of pressure ports 85. As may be seen only in FIG. 2, not all of the pressure ports 85 are the same size. Just above the line 5—5 in FIG. 2, the port 85 is somewhat smaller than the ports which are "above" it in FIG. 2, while the port 85 which is shown one-half at the bottom of FIG. 2 and one-half at the top of FIG. 2 is smaller still. Between the smaller ports just discussed, the spool 35 defines a load sense drain port 86 (which is shown solid in FIG. 2 for clarity, even though it is located in the spool), which will be discussed further in connection with FIG. 5. The ports 85 immediately above and below the load sense drain port 86 are made smaller so that they will not communicate with the drain port 86 as the spool and sleeve are relatively displaced, as will be described subsequently. Disposed axially outward from the ports 85, the sleeve defines two sets of auxiliary ports 87L and 87R, the function of which will be described subsequently. Further axially outward from the ports 85, the sleeve defines two sets of meter ports 89L and 89R, and further outward, there are two sets of operating ports 91L and 91R. Finally, to the left of the drive pin 53 in FIG. 2, there is a pair of drain holes 92, each of which includes a smaller hole and a larger hole, located eccentrically relative to each other.

Referring still primarily to FIGS. 2 and 3, the "neutral" position of the spool 35 and sleeve 37 is illustrated, wherein the springs 57 bias the spool and sleeve to a position in which the ends of the drive pin 53 are disposed at the center (i.e., in a circumferential direction) of the pin openings 55. In addition, certain of the ports are in a neutral (i.e., in a circumferential direction) position relative to an adjacent notch. For example, one of the ports 85 in FIG. 2 is disposed near the "upper" end of the notch 75R, such that relative rotation between the spool and the sleeve would be required for communication to occur from the port 85 to the notch 75R.

At the same time, a number of ports are in a neutral position (i.e., in an axial direction) relative to various spool passages. For example, in the neutral position, flow through the ports 85 is blocked by the spool land 69, with each of the ports 85 being axially equidistant from the meter grooves 67L and 67R. Similarly, flow through the operating ports 91L and 91R is blocked by the spool lands 73L and 73R, respectively, and each of the ports 91L and 91R is axially equidistant from the adjacent grooves 71L and 67L, and 67R and 71R, respectively. Therefore, although the above description has been in terms of a circumferential neutral and an axial neutral, it should be apparent to those skilled in the art that the constraint of the drive pin 53 within the openings 55 is such that relative neutral position in a circumferential (rotational) direction insures neutral in the axial position, and hereinafter, reference will be to merely the "neutral" position.

Initial Operating Position

Referring now primarily to FIG. 4, there will be a description of an operating position, resulting when the vehicle operator rotates the steering wheel (and therefore, the spool 35) in a counter-clockwise (left turn) condition, such that the spool moves "upward" in FIG. 4, relative to the sleeve. As the spool is rotated, relative to the sleeve, the sleeve also begins to move axially toward the right in FIG. 4 from the neutral position shown in FIG. 2.

In the subject embodiment, after approximately four to six degrees of relative rotation of the spool and sleeve, one of the ports 85 begins to communicate with the notch 75R, the overlap therebetween defining a main variable flow control orifice A1r, the "r" indicating the formation of a flow control orifice in response to relative rotation of the spool and sleeve. Pressurized fluid flows through that particular port 85, then through the notch 75R into the meter groove 67R, then through the meter ports 89R, and through the meter 17 in the manner described previously. The metered fluid flows through the meter ports 89L, then through the meter groove 67L, then through the notch 79L and one of the operating ports 91L, the overlap therebetween defining a variable flow control orifice A4r. This metered fluid then flows through the annular chamber 27c (see FIG. 3) and then to the steering cylinder in the manner described previously. Return fluid from the steering cylinder flows through the annular chamber 29c, then through one of the operating ports 91R, which is in communication with the notch 81R, the overlap therebetween defining a variable flow control orifice A5r. Return fluid then flows through the tank groove 71R, then through the tank ports 77, through the interior of the spool 35, then out through the pin openings 55 and the drain holes 92 to the annular chamber 25c, then to the return port.

It should be understood that the fluid path just described, with flow control orifices being defined in response to relative rotation of the spool and sleeve, comprises part of the main fluid path. However, it should also be understood that the formation of such rotary orifices is not an essential feature of the present invention, but instead, is included primarily to insure a fairly accurate, predictable beginning of steering flow, as the vehicle operator rotates the steering wheel.

It may be seen in FIG. 4 that the pin opening 55 is oriented at an angle A relative to a circumferentially-extending line. As a result, each of the ports defined by the sleeve may be considered as moving (i.e., relative to the spool) from its neutral position in FIG. 2 "downward" and slightly to the right along a path corresponding to the angle A. It may also be seen in FIG. 4 that the notch 75R (and each of the other notches, as well) defines an angle B. If the angle B were equal to the angle A, continued relative movement of the port 85 and the notch 75R from the position shown in FIG. 4 would not result in any increase in the area of the A1r, A4r or A5r orifices. However, it is normally considered desirable in steering control units for the flow area to increase progressively as the steering wheel is rotated at a faster rate, or with a greater torque. Therefore, in the subject embodiment, the angle B is less than the angle A, such that the area of the flow control orifice A1r increases with increasing displacement between the spool and sleeve. Assuming that the notches 79L and 81R also define the angle B, the area of the flow control orifices A4r and A5r will also increase with increasing displacement between the spool and sleeve.

Referring still to FIG. 4, in a left turn condition, the auxiliary ports 87R, which are always in open communication with the meter groove 67R, are also beginning to communicate with the annular chamber 31cR. As may best be seen in FIG. 5 (in which the sleeve 37 is in the neutral position), the annular chambers 31cL and 31cR are in communication with the load sensing fluid port by means of passages 93L and 93R, respectively. Therefore, with the sleeve 37 in the operating position of FIG. 4, the ports 87R communicate a load pressure from the groove 67R, downstream of the A1r orifice, through the annular chamber 31cR and passage 93R to the load sensing port 31. At the same time, the auxiliary ports 87L are beginning to communicate with the annular chamber 23c, thus receiving pressurized fluid from the inlet port 23. Pressurized fluid flows through the ports 87L, in parallel with the main fluid path and bypassing the fluid meter 17, then recombining with the main fluid path in the meter groove 67L, upstream of the A4r orifice. The result is a greater total flow to the steering cylinder than the capacity of the fluid meter 17, but with the flow to the steering cylinder still being in a predetermined relationship to the relative displacement between the spool and sleeve. The concept of a parallel amplification or bypass flow may be better understood by reference to U.S. Pat. No. 4,759,182, issued in the name of Donald M. Haarstad for a "STEERING CONTROL UNIT WITH FLOW AMPLIFICATION", assigned to the assignee of the present invention and incorporated herein by reference.

Referring now primarily to FIG. 5, and after a steering operation has been completed, the sleeve 37 returns to the neutral position illustrated in FIGS. 2 and 3. As the sleeve approaches the neutral position, the steering load pressure is still present in the port 31, the passage 93R, and the annular chamber 31cR (as well as in the rest of the load sensing circuit connected to the port 31). When the sleeve is again in the neutral position, an angled drain passage 95 drilled in the sleeve 35 is effective to drain the load pressure from the annular chamber 31cR, and the rest of the load sensing circuit, to the load sense drain port 86 drilled in the spool 35, such that the entire load sense drain circuit is connected through the interior of the return port 25 and the system reservoir. As will be understood by those skilled in the art, because both annular chambers 31cL and 31cR are connected by the passages 93L and 93R, respectively, to the load sensing port 31, only a single drain passage 95 is required to drain the entire load signal circuit, regardless of the direction, from the neutral position, in which the sleeve has been displaced.

Maximum Displacement

Referring now primarily to FIG. 6, continued rotation of the steering wheel by the vehicle operator continues movement of the spool, relative to the sleeve, generally upward and to the left from the position shown in FIG. 4 to that shown in FIG. 6, along a path corresponding to the angle A as described previously. Although FIG. 6 is not quite at the maximum displacement position, which would occur when the pin 53 reaches the bottom of the opening 55, it will be recognized that the sleeve 37 is approaching its maximum displacement position.

As the displacement of the sleeve 37, relative to the spool 35, continues from the position shown in FIG. 4, toward the position shown in FIG. 6, the variable flow control orifices A1r, A4r, and A5r continue to increase until the ports 85, 91L, and 91R reach the end of the notches 75R, 79L, and 81R, respectively. Then, as A1r, A4r, and A5r begin to decrease, a different mode of valving begins to open (see FIG. 9).

It is an important aspect of the present invention that, over a major portion of the relative displacement of the spool and sleeve, flow control orifices are defined in response to the relative axial position (and displacement) of the spool and sleeve. Referring to FIG. 7, in conjunction with FIG. 6, as the sleeve is displaced axially to the right, relative to the spool, from the position shown in FIG. 4 to the position shown in FIG. 6, formation of "axial" orifices begins. See also FIG. 9 wherein the transition from rotary orifices to axial orifices occurs between about 15 degrees and about 25 degrees of relative spool-sleeve displacement. Note in FIG. 9 that the "A1-TOTAL" curve is drawn slightly above the individual A1 curves, for clarity, although over most of the displacement range, A1-TOTAL is merely equal to A1r or A1a. As the sleeve is forced to the right in FIG. 6 by the movement of the pin 53 within the opening 55, the ports 85 begin to communicate with the meter groove 67R, the cumulative overlap therebetween defining a main variable flow control orifice A1a. It will be understood by those skilled in the art that the main fluid path is the same as was described in connection with FIG. 4. Therefore, flow through the A1a orifice flows through the groove 67R, then through the meter ports 89R to the fluid meter 17, with the metered fluid returning through the meter ports 89L, and into the meter groove 67L. This pressurized, metered fluid then flows through a variable flow control orifice A4a, defined by the cumulative overlap of the operating ports 91L and meter groove 67L. This fluid then flows to the steering cylinder as described previously, and returns from the steering cylinder to the operating ports 91R, which now overlap the tank groove 71R, the cumulative overlap therebetween defining a variable flow control orifice A5a. Return fluid flowing through the A5a orifice flows through the tank ports 77, then to the return port 25 in the manner described previously.

Figure 9:
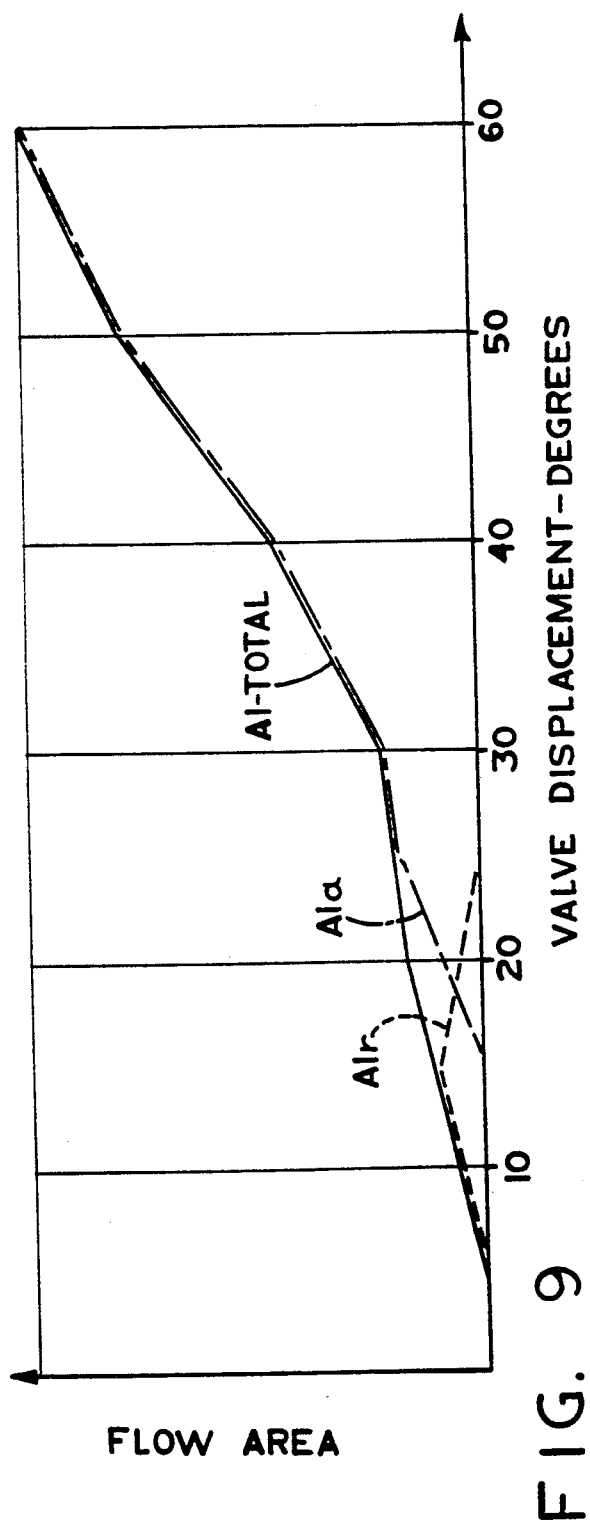
FIG. 9 is a graph of orifice FLOW AREA versus VALVE DISPLACEMENT for the main variable flow control orifice, showing the rotary orifice (A1r, dashed line), the axial orifice (A1a, broken line), and the sum (A1 - TOTAL, solid line) of the two orifices.

As may best be seen in the graph of FIG. 9, the flow through the A1r, A4r, and A5r flow control orifices is substantially less than that through the A1a, A4a, and A5a flow control orifices. Although the area of overlap of each port and its respective groove in FIG. 6 is not especially large, it should be noted that "rotary" orifices have been defined by only a single port, and a single notch, whereas the axial orifices are defined by at least five ports (see FIG. 2) and their respective grooves, for either direction of displacement. Thus, the total flow area of the "axial" orifices is substantially greater than that of the "rotary" orifices. Subsequent references hereinafter, and in the appended claims, to an "operating position" will be understood to refer to the position of the spool and sleeve after the A1a, A4a, and A5a orifices have begun to open. It is in this position of the spool and sleeve that most normal steering activity occurs.

One significant aspect of the present invention is that it facilitates large deflection (wide angle) operation, as those terms are explained in greater detail in the parent application, U.S. Ser. No. 602,829, now U.S. Pat. No. 5,080,135, assigned to the assignee of the present invention and incorporated herein by reference. The layout view of FIG. 2 represents the entire 360° circumference of the spool and sleeve. Preferably, the pin opening or slot 55 is configured such that displacement of the sleeve 37 from its neutral position to its maximum displacement position occurs in response to rotational movement of the spool 35, relative to the sleeve, of at least about 30°. Even more preferable would be a relative rotational movement of about 45°, in order to achieve maximum axial displacement, and in the subject embodiment, the relative rotation between the spool and sleeve is about 60°, in order to achieve maximum axial displacement of the sleeve. Such large rotational displacements, in order to achieve the maximum axial displacement of the spool and sleeve (and therefore the maximum flow area therebetween) substantially reduces the likelihood of steering "jerk", which can occur in many of the prior art steering control units, especially when used on large, articulated vehicles.

An important feature and benefit of the present invention relates to pressure balancing. One of the problems typically experienced in a fluid controller of the type having a relatively displaceable spool and sleeve is that certain regions of the sleeve are subjected to relatively high pressure (e.g., 3000 psi), thus tending to "clamp" the sleeve about the spool. Such clamping is most likely to occur after a steering operation is complete, but there is a trapped load (and therefore, high pressure in the annular chamber 27c), the spool and sleeve return to neutral, and pressure within the spool and sleeve is relatively low. It is desirable to be able to provide some form of pressure balancing of the sleeve 37, to counteract the force of the pressure in the annular chamber 27c. In many of the conventional spool and sleeve fluid controllers, it has been extremely difficult to locate effective pressure balancing areas, without interfering with the main fluid path. However, the configuration of the spool 35 of the present invention greatly facilitates pressure balancing.

Referring now primarily to FIGS. 6 and 8, the pressure balancing groove 83L extends about the entire circumference of the spool land 73L. Similarly, the pressure balancing groove 83R extends about the entire circumference of the spool land 73R. With the sleeve 37 in the left turn condition shown in FIGS. 4 and 6, pressurized fluid is contained in the annular chamber 27c, and is also contained throughout the pressure balancing groove 83L, exerting a radially-outward biasing force on the sleeve, in opposition to the force exerted by the pressure in the annular chamber 27c. As may be seen by comparing FIG. 2 (neutral position) with FIGS. 6 and 8, for any position of the sleeve 37 relative to the spool 35, whatever pressure is in the annular chamber 27c is also in the pressure balancing groove 83L, by means of the operating ports 91L. Similarly, whatever pressure is in the annular chamber 29c is present within the pressure balancing groove 83R by means of the operating ports 91R.

Referring now primarily to FIGS. 6 and 7, as the sleeve 37 is displaced from the position shown in FIG. 4, defining "rotary" orifices to the position shown in FIG. 6 defining "axial" orifices, the auxiliary ports 87R continue to communicate a steering load pressure from the meter groove 67R, from downstream of the A1a orifice (instead of downstream of the A1r orifice), to the load sensing port 31 in the same manner as described previously. At the same time, the auxiliary ports 87L continue to communicate an amplification flow from the annular chamber 23c into the meter groove 67L, upstream of the A4a orifice (instead of upstream of the A4r orifice) in the same manner as described previously.

Right Turn Condition

Referring now primarily to FIG. 2 again, it may be seen that if the vehicle operator rotates the steering wheel, and therefore, the spool 35, in a clockwise direction, the main fluid path will be "reversed" and the steering cylinder will be displaced in the opposite direction to effect a right turn of the vehicle.

As the sleeve moves upward and to the left, relative to the spool, from the position shown in FIG. 2, one of the ports 85 initially communicates with the notch 75L, to define therebetween the A1r flow control orifice. Pressurized fluid flows through the A1r orifice into the meter groove 67L, then through the meter ports 89L, through the fluid meter 17, then through the meter ports 89R and into the meter groove 67R. This metered fluid then flows through the notch 79R, and through one of the operating ports 91R, which defines the A4r flow control orifice, and from there to the steering cylinder. Exhaust fluid from the steering cylinder flows through one of the operating ports 91L, and through the notch 81L, which define the A5r orifice, and from there flows through the tank groove 71L and through the drain holes 92 to the return port 25.

As the sleeve is displaced further, the ports 85 begin to communicate with the meter groove 67L to define the A1a flow control orifice, the operating ports 91R begin to communicate with the meter groove 67R to define the A4a flow control orifice, and the operating ports 91L begin to communicate with the tank groove 71L to define the A5a flow control orifice. When the spool and sleeve are relatively displaced to a right turn condition, the auxiliary ports 87L now comprise load sensing ports, and communicate the steering load pressure from the meter groove 67L, downstream of the A1r and A1a orifices into the annular chamber 31cL, and from there through the passage 93L to the load sensing port 31. At the same time, the auxiliary ports 87R are now in communication with the annular chamber 23c, to communicate amplification flow from the inlet port 23 through the ports 87R into the meter groove 67R in the manner described previously.

Alternative Embodiment

Figure 11:
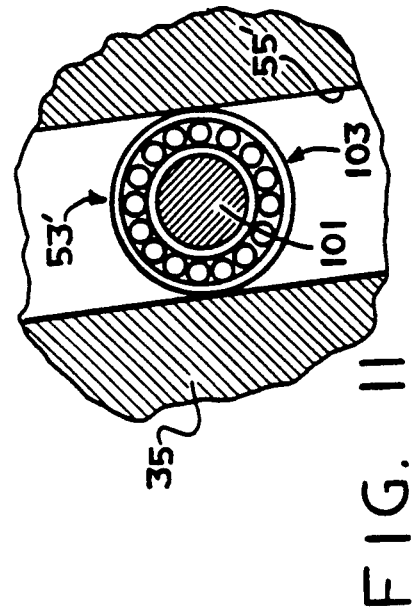
FIG. 11 is an axial cross-section, taken on line 11—11 of FIG. 10, and on the same scale.
Figure 10:
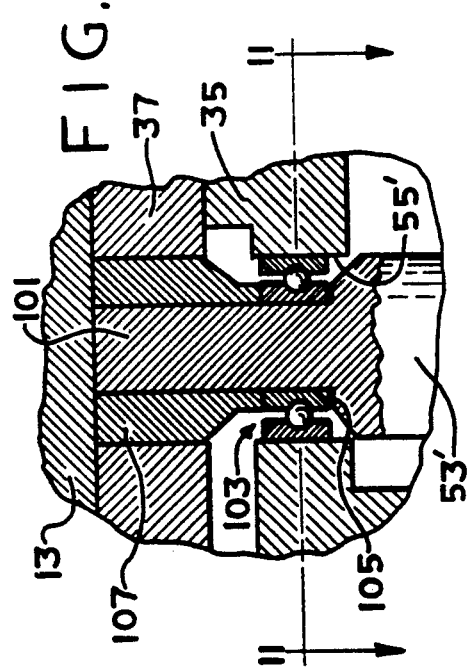
FIG. 10 is an enlarged, fragmentary, axial cross-section, similar to FIG. 3, but on a larger scale, illustrating an alternative embodiment of the present invention.

Referring now primarily to FIGS. 10 and 11, there is illustrated an alternative embodiment of the present invention which relates, not to the valving configuration illustrated previously, but instead relates to the mechanism for displacing the sleeve 37 axially in response to relative rotation of the spool 35.

In the present invention, the pin opening 55 acts somewhat in the manner of a cam surface, engaging the drive pin 53 with sufficient force to bias the sleeve 37 in one axial direction or the other. As a result, there is reason for concern about possible wear between the drive pin and the pin opening, and any such wear could adversely affect steering action by changing the relationship between rotational displacement of the spool and axial displacement of the sleeve. Also, frictional engagement between the pin and opening could introduce undesirable hysteresis into the neutral re-centering of the springs 57.

In the alternative embodiment of FIGS. 10 and 11, the drive pin 53 is replaced with a modified drive pin 53' which, preferably, would be somewhat larger in diameter over most of its length, and would be received in a larger pin opening 55'. Adjacent each end of the drive pin 53', there is a reduced diameter portion 101, and disposed about the portion 101 is a small ball bearing set 103, the bearing set being disposed against a shoulder 105 defined by the drive pin 53'. After the bearing set 103 is in place on each of the portions 101, a cylindrical cap 107 is disposed about the portion 101, and insures proper location of the bearing set 103. The cap 107 is preferably just slightly smaller than the opening in the sleeve 37. The use of the ball bearing set 103 eliminates the rubbing engagement between the drive pin 53 and the pin opening 55, and instead, there is a rolling engagement between the outer race of the bearing set 103 and the pin opening 55'.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A controller operable to control the flow of fluid from a source of pressurized fluid to a fluid pressure operated device; said controller being of the type including housing means defining an inlet port for connection to the source of pressurized fluid, a return port for connection to a reservoir, and first and second control fluid ports for connection to the fluid pressure operated device; valve means disposed in said housing means, and comprising a primary, rotatable valve member and a cooperating, relatively rotatable, follow-up valve member, said primary and follow-up valve members defining a neutral position, and a first operating position in which said primary valve member is rotatably displaced from said neutral position, relative to said follow-up valve member in a first direction; said primary valve member defining first and second fluid passages, and said follow-up valve member defining first and second fluid ports in continuous fluid communication with said inlet port, and said first control fluid port, respectively; said first and second fluid ports being blocked from fluid communication with said first and second fluid passages, respectively, when said valve members are in said neutral position, and said first and second fluid ports being in fluid communication with said first and second fluid passages, respectively, when said valve members are in said first operating position; said housing means and said valve members cooperating to define a first main fluid path providing fluid communication from said inlet port to said first control fluid port, and from said second control fluid port to said return port, when said valve members are in said first operating position; characterized by:

(a) means operable, in response to relative rotational displacement of said primary and follow-up valve members, to move said follow-up valve member in a first axial direction to said first operating position;

(b) said first and second fluid ports cooperating with said first and second fluid passages, respectively, to define first and second variable axial flow control orifices, respectively, when said follow-up valve member is axially displaced to said first operating position; and (c) said first main fluid path including said first and second variable axial flow control orifices.

2. A controller as claimed in claim 1, characterized by fluid flowing through said first and second variable axial flow control orifices comprising a major portion of the fluid flow through said first main fluid path when said valve members are in said first operating position.

3. A controller as claimed in claim 1, characterized by said primary and follow-up valve members cooperating to define a maximum displacement position, and fluid flow through said first and second variable axial flow control orifices comprising substantially all of the fluid flow through said first main fluid path when said valve members are in said maximum displacement position.

4. A controller as claimed in claim 1, characterized by fluid actuated means for imparting follow-up movement to said follow-up valve member proportional to the volume of fluid flow through said first main fluid path when said valve members are in said first operating position.

5. A controller as claimed in claim 4, characterized by said fluid actuated means including a metering member rotatable in response to the flow of fluid through said first main fluid path, and a shaft member rotatable with said metering member, and operable to impart said follow-up movement to said follow-up valve member.

6. A controller as claimed in claim 5, characterized by said shaft member including a drive member extending radially through at least one drive opening defined by said primary valve member and into engagement with said follow-up valve member, said means for imparting follow-up movement to said follow-up valve member including said drive member and said engagement thereof with said follow-up valve member.

7. A controller as claimed in claim 6, characterized by said drive opening comprising an elongated slot extending both circumferentially and axially, whereby rotational movement of said primary valve member, relative to said follow-up valve member moves said follow-up valve member in said first axial direction.

8. A controller as claimed in claim 7, characterized by said axial and circumferential extent of said elongated slot being selected to move said valve members from said neutral position to a maximum displacement position in response to said rotational movement of said primary valve member, relative to said follow-up valve member, being equal to at least about thirty degrees.

9. A controller as claimed in claim 8, characterized by movement of said primary and follow-up valve members from said neutral position to said maximum displacement position occurring in response to said rotational movement of primary valve member, relative to said follow-up valve member, being equal to at least about forty five degrees.

10. A controller as claimed in claim 1, characterized by said housing means defining an annular pressure groove in continuous fluid communication with said inlet port, said first fluid port, defined by said follow-up valve member being disposed in continuous fluid communication with said annular pressure groove, as said follow-up valve member moves axially between said neutral position and said maximum displacement position.

11. A controller as claimed in claim 10, characterized by said first and second fluid passages defined by said primary valve member comprising first and second generally annular grooves, disposed axially on opposite sides of said annular pressure groove.

12. A controller as claimed in claim 11, characterized by said housing means defining a load sensing port, and an annular load sensing groove disposed adjacent said annular pressure groove, said follow-up valve member defining a load sensing port providing continuous fluid communication between said first annular groove defined by said primary valve member and said annular load sensing groove, when said valve members are in said first operating position.

13. A controller as claimed in claim 12, characterized by fluid actuated means for imparting follow-up movement to said follow-up valve member proportional to the volume of fluid flow through said first main fluid path, and said follow-up valve member defining a flow amplification port disposed to provide continuous fluid communication between said annular pressure groove and said second annular groove, when said valve members are in said first operating position.

14. A controller as claimed in claim 1, characterized by said primary valve member defining a first spool land disposed axially adjacent said second fluid passage and disposed to block fluid communication from said second fluid passage through said second fluid port defined by said follow-up valve member when said valve members are in said neutral position.

15. A controller as claimed in claim 14, characterized by said first spool land defining a first annular pressure balancing groove disposed to be in continuous fluid communication with said second fluid port defined by said follow-up valve member, as said valve members are displaced from said neutral position to said first operating position.

16. A controller as claimed in claim 15, characterized by said follow-up valve member defining a third fluid port in continuous fluid communication with said second control fluid port, said third fluid port being blocked from fluid communication with said return port when said valve members are in said neutral position, and said third fluid port being in fluid communication with said return port when said valve members are in said first operating position.

17. A controller as claimed in claim 16, characterized by said primary valve member defining a second spool land disposed axially adjacent said first fluid passage and disposed to block fluid communication from said first fluid passage through said third fluid port when said valve members are in said neutral position, said second spool land defining a second annular pressure balancing groove disposed to be in continuous fluid communication with said third fluid port defined by said follow-up valve member, as said valve members are displaced from said neutral position to said first operating position.

18. A controller as claimed in claim 1, characterized by said primary valve member defining an axially-extending rotary fluid passage in open fluid communication with said first fluid passage, said first fluid port being blocked from fluid communication with said rotary fluid passage when said valve members are in said neutral position, said first fluid port communicating with said rotary fluid passage, to define a variable, rotary flow control orifice as said primary valve member is rotatably displaced from said neutral position, relative to said follow-up valve member, in said first direction, fluid flow through said variable, rotary flow control orifice comprising part of said first main fluid path.

19. A controller as claimed in claim 18, characterized by said variable, rotary flow control orifice begins to open before said first variable axial flow control orifice begins to open, as said valve members are displaced from said neutral position toward said first operating position.

20. A controller as claimed in claim 18, characterized by the fluid flow through said variable, rotary flow control orifice being substantially less than the fluid flow through said first variable axial flow control orifice, when said valve members are in said first operating position.

* * * * *